United States Patent
Ogawa et al.

(10) Patent No.: US 10,983,274 B2
(45) Date of Patent: Apr. 20, 2021

(54) OPTICAL WAVELENGTH MULTIPLEXER/DEMULTIPLEXER

(71) Applicant: NTT Electronics Corporation, Yokohama (JP)

(72) Inventors: Daisuke Ogawa, Yokohama (JP); Youichi Nishizato, Yokohama (JP)

(73) Assignee: NTT ELECTRONICS CORPORATION, Kanagawa (JP)

( * ) Notice: Subject to any disclaimer, the term of this patent is extended or adjusted under 35 U.S.C. 154(b) by 0 days.

(21) Appl. No.: 16/769,453

(22) PCT Filed: Nov. 21, 2018

(86) PCT No.: PCT/JP2018/043071
§ 371 (c)(1),
(2) Date: Jun. 3, 2020

(87) PCT Pub. No.: WO2019/111718
PCT Pub. Date: Jun. 13, 2019

(65) Prior Publication Data
US 2020/0386942 A1    Dec. 10, 2020

(30) Foreign Application Priority Data

Dec. 6, 2017 (JP) .............................. JP2017-234357

(51) Int. Cl.
*G02B 6/12* (2006.01)
(52) U.S. Cl.
CPC ..... *G02B 6/12016* (2013.01); *G02B 6/12014* (2013.01); *G02B 6/12009* (2013.01); *G02B 6/12019* (2013.01); *G02B 6/12033* (2013.01)
(58) Field of Classification Search
CPC ............ G02B 6/12016; G02B 6/12014; G02B 6/12009; G02B 6/12019; G02B 6/12033
See application file for complete search history.

(56) References Cited

U.S. PATENT DOCUMENTS

| 6,055,078 A * | 4/2000 | Chen ................. G02B 6/12019 398/1 |
| 6,608,948 B2 * | 8/2003 | Delisle .............. G02B 6/12033 385/14 |

(Continued)

FOREIGN PATENT DOCUMENTS

| JP | H11-160555 A | 6/1999 |
| JP | 2004-145166 A | 5/2004 |
| JP | 2007-94063 A | 4/2007 |

OTHER PUBLICATIONS

International Search Report on Patentability dated Jun. 9, 2020, issued in PCT Application No. PCT/JP2018/043071, filed Nov. 21, 2018.

(Continued)

*Primary Examiner* — Ryan A Lepisto
(74) *Attorney, Agent, or Firm* — Workman Nydegger

(57) ABSTRACT

A broadband optical wavelength multiplexer/demultiplexer is provided. Two waveguides are arranged such that, in a case where a connection position where one of the two waveguides is connected to a first slab waveguide is set closer to the other waveguide by a channel frequency interval $\Delta f$, a central position between the two waveguides aligns with a central position on a connection end surface of the first slab waveguide, and two waveguide groups of an output waveguide are arranged such that a central position between the two waveguide groups aligns with a central position of a second slab waveguide, and an interval between a connection position where the other waveguide is connected to the first slab waveguide and the central position on the connection end surface of the first slab waveguide is set equal to an interval between a connection position where the waveguide groups are connected to the second slab waveguide.

4 Claims, 5 Drawing Sheets

(56) References Cited

U.S. PATENT DOCUMENTS

| | | | | |
|---|---|---|---|---|
| 6,678,446 B1* | 1/2004 | McGreer | ............ | G02B 6/12016 |
| | | | | 385/132 |
| 6,842,560 B2* | 1/2005 | Yamauchi | ............... | H04J 14/02 |
| | | | | 385/24 |
| 6,956,993 B2* | 10/2005 | Bernasconi | ........ | G02B 6/12016 |
| | | | | 385/37 |
| 7,095,923 B1* | 8/2006 | Whiteaway | ........ | G02B 6/12016 |
| | | | | 385/14 |
| 7,440,655 B2* | 10/2008 | Grek | ................. | G02B 6/12016 |
| | | | | 385/37 |
| 7,542,640 B2* | 6/2009 | Nara | ................. | G02B 6/12009 |
| | | | | 385/14 |
| 2003/0133655 A1 | 7/2003 | Dingel | | |

OTHER PUBLICATIONS

International Search Report dated Dec. 25, 2018, issued in PCT Application No. PCT/JP2018/043071, filed Nov. 21, 2018.

K. Okamoto and A. Sugita, "*Flat Spectral Response Arrayed-Waveguide Grating Multiplexer with Parabolic Waveguide Horns,*" Electronics Letters, vol. 32, No. 18, Aug. 29, 1996, pp. 1661-1662.

D. Seyringer, *Calculation of Accurate Channel Spacing of an AWG Optical Demultiplexer Applying Proportional Method*, Proceedings of SPIE, Jun. 1, 2015, vol. 9520, pp. 95200T-1-95200T-8.

* cited by examiner

OPTICAL WAVELENGTH MULTIPLEXER/DEMULTIPLEXER

TECHNICAL FIELD

The present embodiment relates to an optical wavelength multiplexer/demultiplexer.

BACKGROUND ART

With a recent increase in communication demand and in demand for distribution of high-definition moving images, future optical communication networks are expected to have an increased speed of 100 Tbps or higher and an increased capacity. A technique supporting high-speed high-capacity communication is wavelength multiplexing (WDM: Wavelength Division Multiplexing), and an important device is an optical wavelength multiplexer/demultiplexer. Among optical wavelength multiplexers/demultiplexers, an arrayed waveguide grating (AWG) including waveguides formed on a planar substrate is advantageous in suppressed variation in properties because arrayed waveguide gratings are excellent in small-scale integratability and mass productivity and can be produced with the same process and the same number of steps.

Furthermore, communication based on a modulation scheme at a high speed of, for example, 100 Gbps per channel requires a very wide bandwidth. The AWG generally has a band property in a flat top shape and enables to cover wavelength shift of a light source. However, providing the band property needed for the high-speed modulation scheme needs to further extend the band property. To satisfy this, the current channel frequency interval needs to be increased. However, an increase in channel frequency interval reduces the total number of channels within the operating wavelength range, leading to a reduced total capacity. Thus, the band property is desirably extended with keeping the channel frequency interval.

FIG. 4A and FIG. 4B illustrate an example of a configuration of a conventional AWG 100. FIG. 4A illustrates an overall configuration of the AWG 100. The AWG 100 is a one-to-many bidirectional optical element and includes one I/O waveguide 101, two slab waveguides 102 and 104, a parabolic waveguide 106 provided between the one I/O waveguide 101 and the one slab waveguide 102, an arrayed waveguide 103 provided between the two slab waveguides 102 and 104, and an I/O waveguide group 105 including a plurality of waveguides. FIG. 4B illustrates a connection portion between the I/O waveguide group 105 and the slab waveguide 104. As illustrated in FIG. 4B, the I/O waveguide group 105 includes tapered waveguides.

CITATION LIST

Non-Patent Literature

NPL 1: K. Okamoto and A. Sugita, "Flat spectral response arrayed-waveguide grating multiplexer with parabolic waveguide horns" Electronics Letters, vol. 32, pp. 1661-1662, (1996)

SUMMARY OF INVENTION

Technical Problem

However, in the I/O waveguide 105 in the AWG including a plurality of waveguides, a mechanical interval (pitch) between the adjacent waveguides is defined by a channel frequency interval of a multiplexed signal to be demultiplexed (channel frequency interval) as illustrated in FIG. 4B. Thus, in the conventional AWG, even in a case where the width of each of the I/O waveguide 105 is increased, the width is limited to a channel frequency interval between the adjacent waveguides. Setting the width of each of the I/O waveguides in the AWG larger than the channel frequency interval has been difficult. For example, a 3-dB bandwidth in the flat type AWG is typically limited generally to 75% of the channel frequency interval, and the maximum 3-dB bandwidth is limited to 200% of the frequency interval.

In light of the above-described conventional problems, an object of the present invention is to provide an optical wavelength multiplexer/demultiplexer that can set the interval between the adjacent I/O waveguides larger than the channel frequency interval of an input signal.

Solution to Problem

To achieve the object, an invention described in an embodiment is an optical wavelength multiplexer/demultiplexer configured to demultiplex a multiplexed optical signal with a channel number N and a channel frequency interval $\Delta f$ into optical signals each with a wavelength $\lambda$, the optical wavelength multiplexer/demultiplexer including an input waveguide configured to branch an input multiplexed optical signal into two inputs and to output the inputs from respective waveguides, a first slab waveguide including a first end connected to second ends of the two waveguides, an arrayed waveguide connected to a second end of the first slab waveguide and including a plurality of waveguides provided at predetermined intervals and having different waveguide lengths, a second slab waveguide including a first end connected to the arrayed waveguide, and an output waveguide including two waveguide groups each including a plurality of waveguides connected to a second end of the second slab waveguide, wherein the two waveguides are arranged such that, in a case where a connection position where one of the two waveguides is connected to the first slab waveguide is set closer to the other waveguide by a channel frequency interval $\Delta f$, a central position between the two waveguides aligns with a central position on a connection end surface of the first slab waveguide, and the two waveguide groups of the output waveguide are arranged such that a central position between the two waveguide groups aligns with a central position of the second slab waveguide, and an interval between a connection position where the other waveguide is connected to the first slab waveguide and the central position on the connection end surface of the first slab waveguide is set equal to an interval between a connection position where the waveguide groups are connected to the second slab waveguide and a central position on a connection end surface of the second slab waveguide, and an interval between adjacent waveguides in each of the two waveguide groups is set double the channel frequency interval.

DESCRIPTION OF EMBODIMENTS

Embodiments of the present invention will be described below in detail.

First Embodiment

Figure 1:
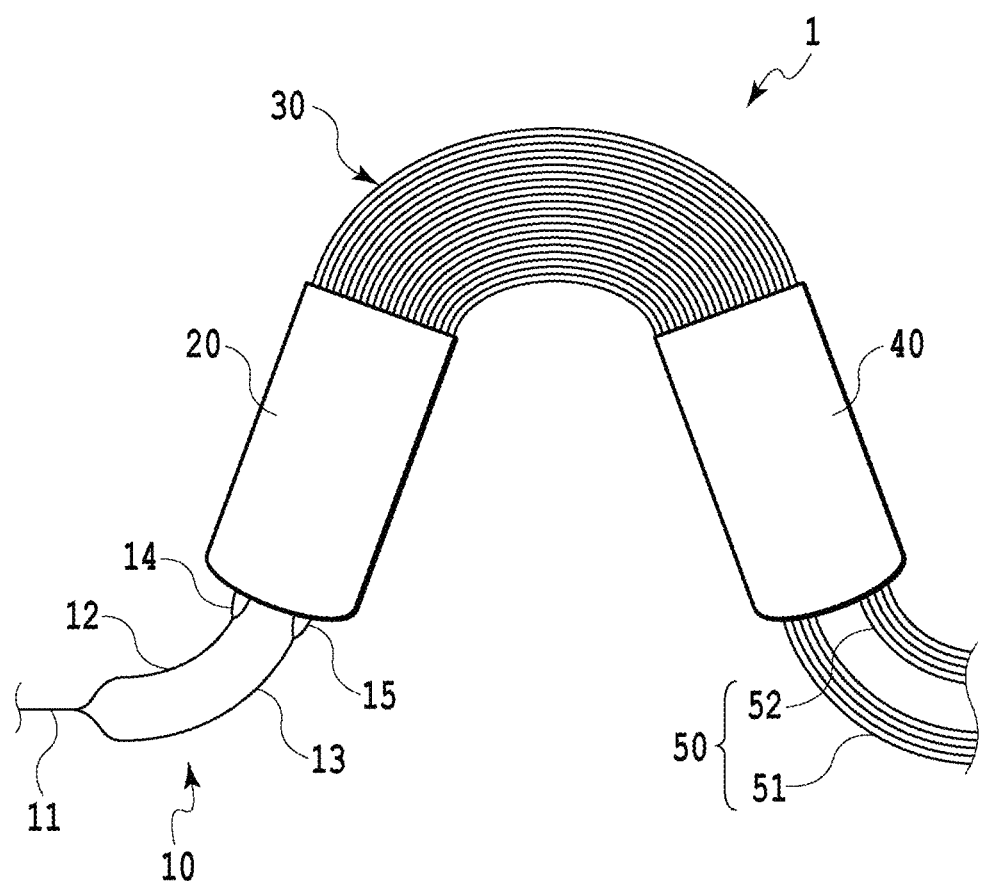
FIG. 1 is a diagram illustrating a configuration example of an optical wavelength multiplexer/demultiplexer according to a first embodiment.
Figure 4A:
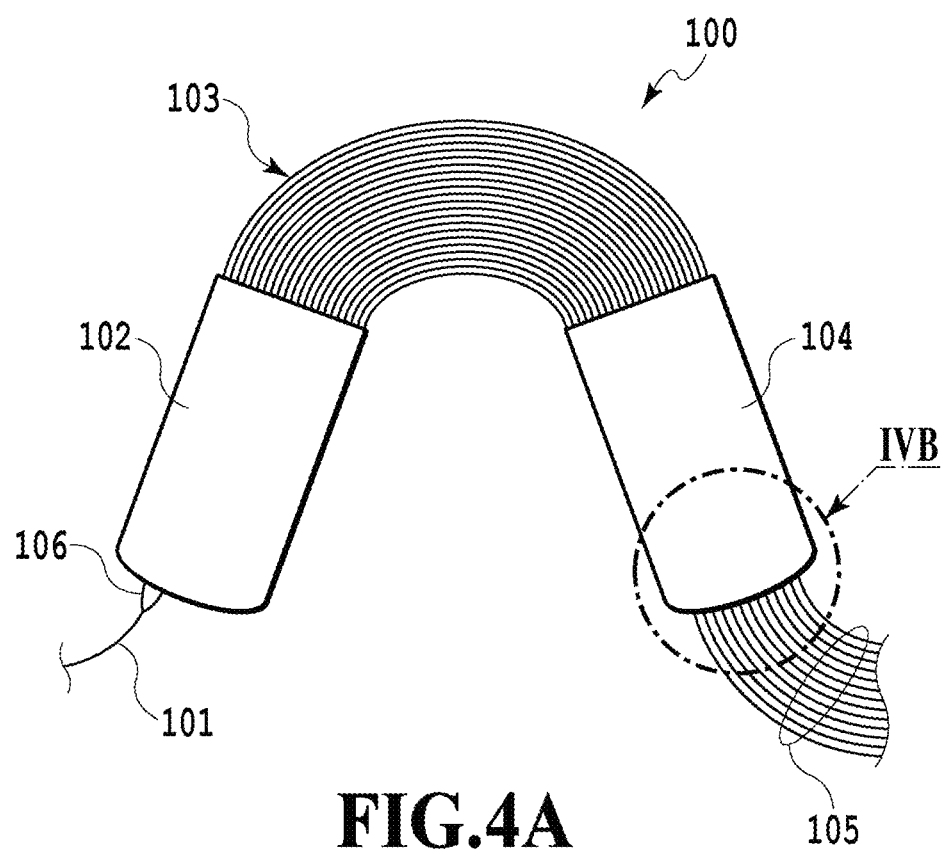
FIG. 4A is a diagram illustrating a general configuration of a conventional AWG optical wavelength multiplexer/demultiplexer.
Figure 4B:
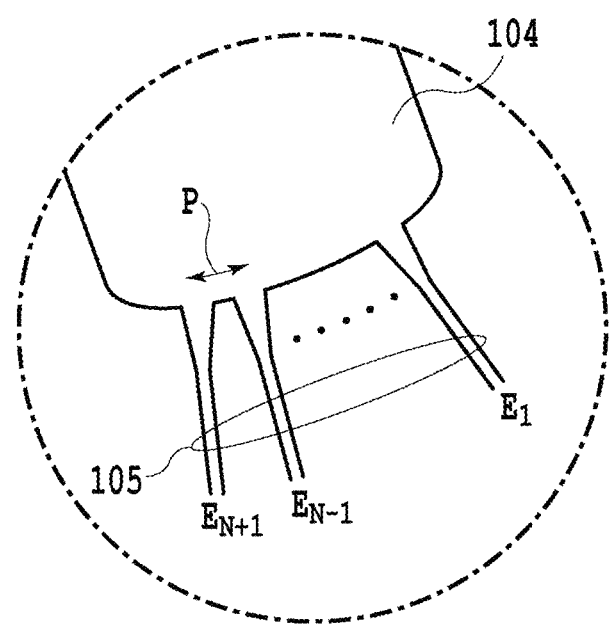
FIG. 4B is a diagram illustrating a connection portion between an I/O waveguide group 105 and a slab waveguide 104 in a conventional AWG optical wavelength multiplexer/demultiplexer.

FIG. 1 is a diagram illustrating a configuration of an optical wavelength multiplexer/demultiplexer according to the present embodiment. The optical wavelength multiplexer/demultiplexer according to the present embodiment will be described on the assumption that a wavelength number (channel number) is N and that a multiplexed optical signal with a channel frequency interval Δf (GHz) is demultiplexed into optical signals each with a wavelength $\lambda_N$. An optical wavelength multiplexer/demultiplexer 1 includes what is called an AWG including a first I/O waveguide 10, a first slab waveguide 20, an arrayed waveguide 30, a second slab waveguide 40, and a second I/O waveguide 50 as illustrated in FIG. 1. The first I/O waveguide branches into two I/Os 12 and 13, which are connected to predetermined positions of the slab waveguide 20 via two parabolic waveguides 14 and 15. Additionally, the second I/O waveguide 50 includes two waveguide groups 51 and 52, and the two waveguide groups 51 and 52 are connected to predetermined positions of the second slab waveguide 40. A portion of the second I/O waveguide 50 connected to the second slab waveguide 40 includes a linear waveguide but may include a tapered waveguide as in an example of the conventional structure in FIG. 4B.

The arrayed waveguide 30 includes a plurality of waveguides arranged in parallel with one another along a circumference of a fan shape and having a length varying by a predetermined length ΔL. The waveguide disposed at the outermost circumference has the largest length, and the waveguide disposed at the innermost circumference has the smallest length. In the description herein, it is assumed that the arrayed waveguide 30 is arranged in a fan shape and that the optical wavelength multiplexer/demultiplexer 1 itself is also formed in a fan shape identified by the outer circumference side and the inner circumference side perpendicularly to an optical wavelength direction.

The first I/O waveguide 10 includes one I/O 11 branched into two I/Os 12 and 13. A multiplexed optical signal with a wavelength number (channel number) N and a channel frequency interval Δf can be input to the first I/O waveguide 10.

One I/O 12 of two inputs to the first I/O waveguide 10 is connected to the parabolic waveguide 14, and the parabolic waveguide 14 is connected to a position displaced circumferentially outward by a predetermined clearance interval ΔWGHz from a central position on a connection end surface of the first slab waveguide 20. The other I/O 13 is connected to the parabolic waveguide 15, and the parabolic waveguide 15 is connected to a position displaced circumferentially inward by a predetermined interval (ΔW+Δf) GHz from the central position on the connection end surface of the first slab waveguide 20, that is, the position opposite to the position of the parabolic waveguide 14 in the circumferential direction. In other words, the two parabolic waveguides 14 and 15 are disposed such that, in a case where one of the two parabolic waveguides 14 and 15, the parabolic waveguide 15, is placed closer to the other parabolic waveguide 14 by the channel frequency interval Δ, a central position between the two parabolic waveguides 14 and 15 aligns with the central position on the connection end surface of the first slab waveguide 20. The clearance interval ΔW is set to a sufficiently large value based on the channel number N and the channel frequency interval Δf of an input optical signal. For example, the clearance interval ΔW can preferably be set at least four times as large as the channel frequency interval Δf.

The second I/O waveguide 50 includes the two waveguide groups 51 and 52. The two waveguide groups 51 and 52 are each provided with N/2 waveguides based on the channel number N of the optical signal input to the optical wavelength multiplexer/demultiplexer 1. The waveguide group 51 is connected to the second slab waveguide 40 such that a central position of the waveguide group 51 is displaced circumferentially inward by the clearance interval ΔWGHz from a central position on a connection end surface of the second slab waveguide 40. The waveguide group 52 is connected to the second slab waveguide 40 such that a central position of the waveguide group 52 is displaced circumferentially outward by the clearance interval ΔWGHz from the central position on the connection end surface of the second slab waveguide 40. That is, the waveguide groups 51 and 52 are disposed such that a central position between the waveguide groups 51 and 52 aligns with the central position of the second slab waveguide 40. Here, the clearance interval ΔW between the central positions of the two waveguide groups 51 and 52 connected to the second I/O waveguide 50 is set the same as the clearance interval ΔW from the central position of the first I/O waveguide 10 (parabolic waveguides 14 and 15) connected to the first slab waveguide 20. Based on the channel frequency interval Δf of the input optical signal, an arrangement interval P (pitch) between the N/2 waveguides of each of the two output waveguide groups 51 and 52 is P=2Δf.

Additionally, the FSR of the optical wavelength multiplexer/demultiplexer 1 can be set to a sufficiently wide value based on the clearance distance ΔW of the two waveguide groups 51 and 52 from the central position on the connection end surface of the second slab waveguide 40 and the channel frequency interval Δf.

Now operations will be described. In the optical wavelength multiplexer/demultiplexer, a multiplexed optical signal including N channels with wavelengths $\lambda_1, \lambda_2, \lambda_3, \ldots, \lambda_N$ is input to the first I/O waveguide 10. The input N multiplexed optical signal is input from the two parabolic waveguides 14 and 15 to the first slab waveguide 20 via Y branching. The optical signal input to the first slab waveguide 20 from different positions is modulated into different phases for respective wavelengths by the arrayed waveguide 30, and the resultant signals are input to the second slab waveguide 40. The optical signals input to the second slab waveguide are demultiplexed into different wavelengths, and the resultant signals are output to the second I/O waveguide 50.

For the multiplexed optical signal including the N channels with the wavelengths $\lambda_1, \lambda_2, \lambda_3, \ldots, \lambda_N$ and input to the first I/O waveguide 10, the optical signals with wavelengths $\lambda_1, \lambda_2, \ldots,$ are sequentially alternately output to each of the two waveguide groups 51 and 52 of the second I/O waveguide 50. Odd-numbered wavelengths $\lambda_1, \lambda_2, \lambda_3, \ldots$ are output to the waveguide group 51, and even-numbered wavelengths $\lambda_2, \lambda_4, \lambda_6, \ldots$ are output to the waveguide group 52.

In this manner, in the optical wavelength multiplexer/demultiplexer according to the present embodiment, the optical signals having the wavelengths $\lambda_1, \lambda_2, \lambda_3, \ldots, \lambda_N$ and input from the first I/O waveguide 10 are alternately output from each of the waveguide groups 51 and 52 of waveguide 50. Accordingly, the waveguide interval P in each of the waveguide groups 51 and 52 can be set to $P=2\Delta f$, which is double the channel frequency interval $\Delta f$.

Additionally, input of an optical signal from the second I/O waveguide allows the optical wavelength multiplexer/demultiplexer according to the present embodiment to function as a multiplexer based on operations opposite to the above-described operations. In this case, the optical signal input from the waveguide group 51 is connected to the parabolic waveguide 14 of the first I/O waveguide 10, and the optical signal input from the waveguide group 52 is connected to the parabolic waveguide 15 of the first I/O waveguide 10.

The optical wavelength multiplexer/demultiplexer according to the present embodiment can increase the interval P between the adjacent waveguides up to the double the input channel frequency interval. Thus, the optical wavelength multiplexer/demultiplexer according to the present embodiment can be produced with a sufficiently large output waveguide width. Accordingly, broadband transmission properties can be maintained even with wavelength deviation.

The optical wavelength multiplexer/demultiplexer according to the present embodiment allows an optical wavelength multiplexer/demultiplexer with a large transmission band to be implemented using a configuration with two inputs in one AWG. The optical wavelength multiplexer/demultiplexer according to the present embodiment can be produced in one AWG, and can thus not only be easily miniaturized but also produced based on precise design. The properties are prevented from varying among the channels, and thus optical wavelength multiplexer/demultiplexers can be produced with uniform properties at high yield, also leading to a cost reduction effect.

Second Embodiment

In the description of the first embodiment, the parabolic waveguide is provided between the first slab waveguide and the two inputs of the input waveguide. However, with the parabolic waveguide omitted, the two inputs of the input waveguide may be connected directly to the first slab waveguide.

Figure 2:
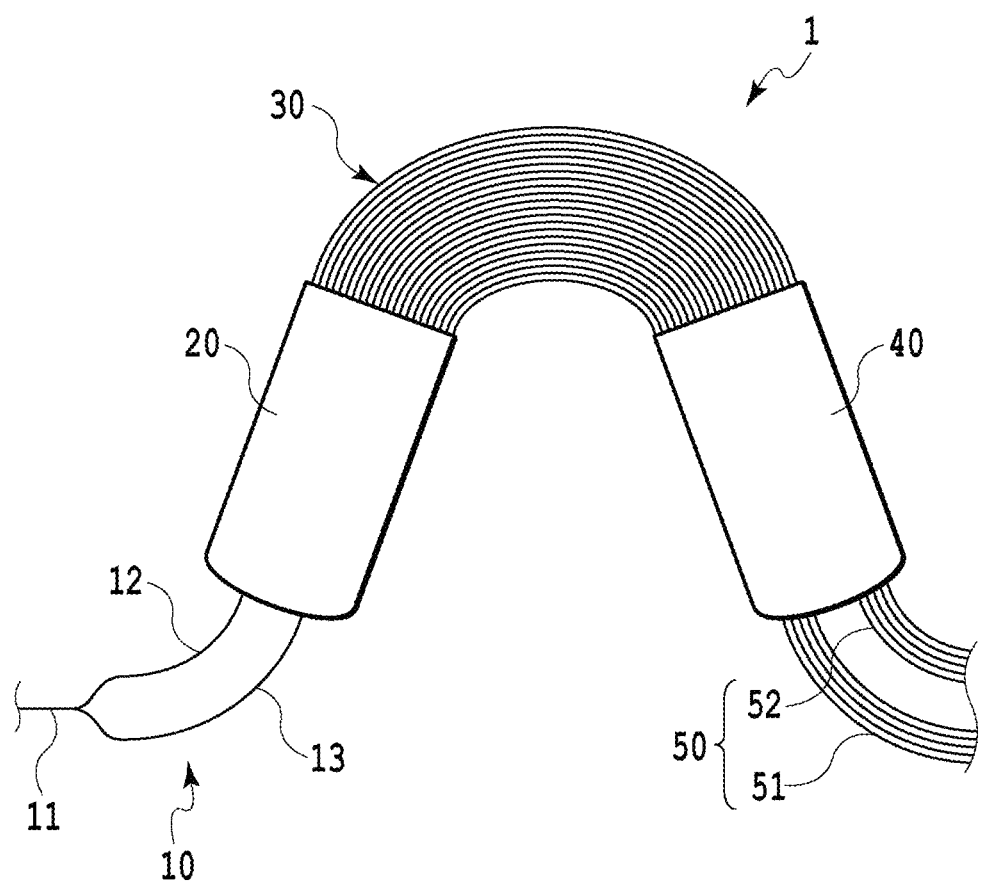
FIG. 2 is a diagram illustrating a configuration example of an optical wavelength multiplexer/demultiplexer according to a second embodiment.

FIG. 2 is a diagram illustrating a configuration example of an optical wavelength multiplexer/demultiplexer according to a second embodiment. The optical wavelength multiplexer/demultiplexer according to the present embodiment, is configured similarly to the first embodiment except that the parabolic waveguide is omitted and that the two I/Os 12 and 13 of the input waveguide are connected directly to the first slab waveguide 20. The corresponding description is thus omitted. Connection positions where the two I/Os 12 and 13 are connected to the first slab waveguide can be set similarly to the connection positions where the two parabolic waveguides 14 and 15 are connected to the first slab waveguide 20.

The optical wavelength multiplexer/demultiplexer according to the present embodiment operates similarly to the optical wavelength multiplexer/demultiplexer according to the first embodiment except that no secondary mode is induced, leading to the band property of the AWG in a Gaussian shape, because the input to the first slab waveguide is a linear waveguide. Although the parabolic waveguide according to the first embodiment induces the secondary mode to provide a flat transmission band, which is advantageous in terms of transmission loss, the linear waveguide according to the second embodiment can realize broadband transmission properties even with wavelength deviation.

According to the optical wavelength multiplexer/demultiplexer in the present embodiment, two inputs are disposed in one AWG to allow an optical wavelength multiplexer/demultiplexer with a large transmission band to be implemented. The optical wavelength multiplexer/demultiplexer according to the present embodiment can be produced in one AWG and can thus not only be easily miniaturized but also produced based on precise design. The properties are prevented from varying among the channels, and thus optical wavelength multiplexer/demultiplexers can be produced with uniform properties at high yield, also leading to a cost reduction effect.

Example 1

Figure 3:
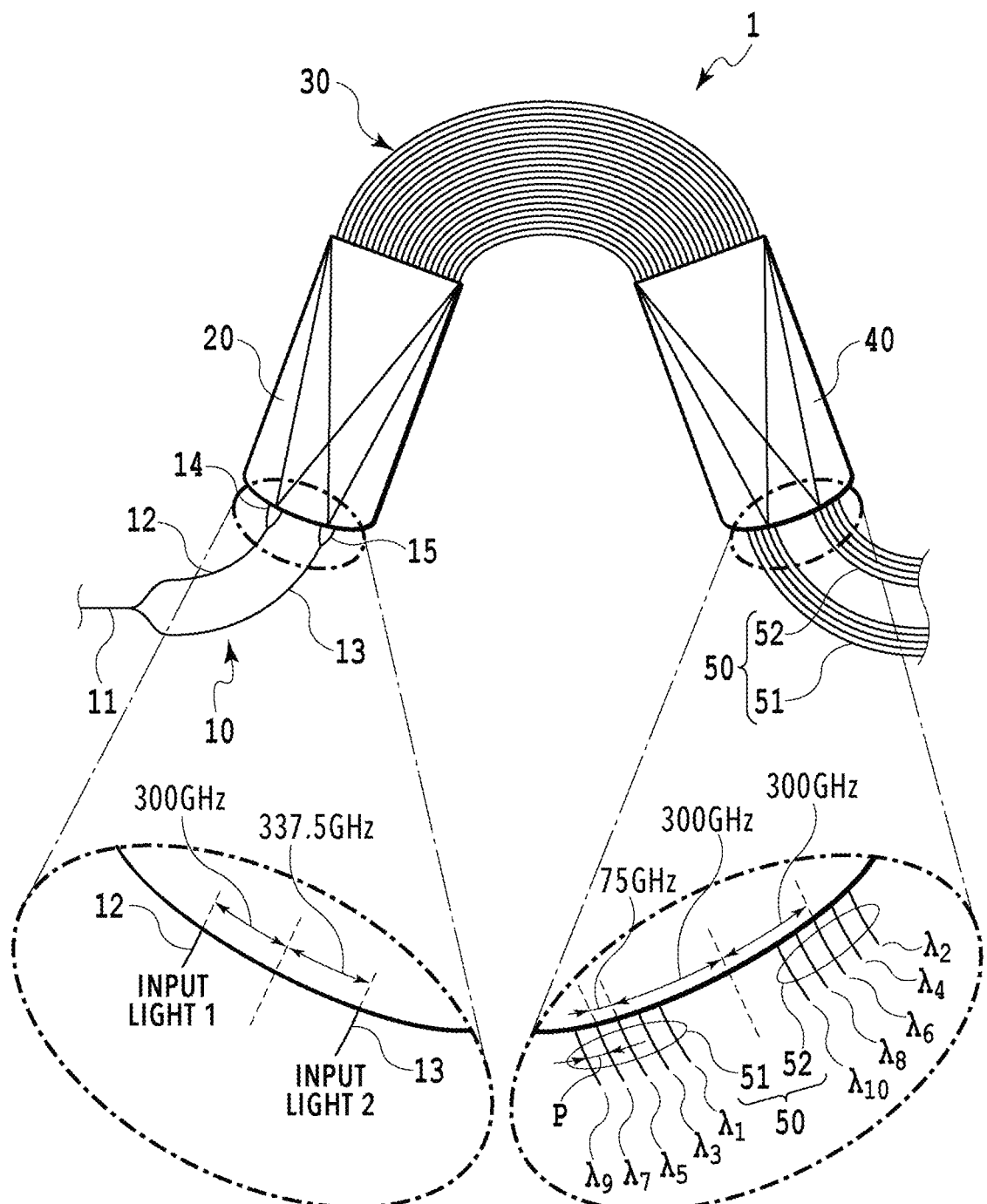
FIG. 3 is a diagram illustrating an example of a configuration of an optical wavelength multiplexer/demultiplexer used in Example 1.

Now, a specific configuration example of the optical wavelength multiplexer/demultiplexer according to the above-described embodiment will be described. FIG. 3 is a diagram illustrating an example of a configuration of the optical wavelength multiplexer/demultiplexer according to the present example. The present example will be described taking the optical wavelength multiplexer/demultiplexer according to the first embodiment as an example. The optical wavelength multiplexer/demultiplexer according to the present example can be configured similarly to the optical wavelength multiplexer/demultiplexer according to the second embodiment except that the parabolic waveguides 14 and 15 are omitted. In the present example, the optical wavelength multiplexer/demultiplexer demultiplexes, into optical signals with the respective wavelengths, a multiplexed optical signal obtained by multiplexing optical signals based on the channel number N=10 and the channel frequency interval $\Delta f=37.5$ GHz. In the present example, the predetermined interval from the central position is set to $\Delta W=300$ GHz, and the FSR of the optical wavelength multiplexer/demultiplexer is set to $2\Delta W+\Delta f=637.5$ GHz.

The two parabolic waveguides 14 and 15 of the first I/O waveguide 10 are arranged across a central position on an input end of the first slab waveguide 20 such that the parabolic waveguide 14 is disposed circumferentially 300 GHz outward from the central position and that the parabolic waveguide 15 is disposed circumferentially 337.5 GHz inward from the central position.

The central positions of the two waveguide groups 51 and 52 of the second I/O waveguide 50 are arranged across a central position on an output end of the second slab waveguide 40 such that the waveguide group 51 is disposed circumferentially 300 GHz inward from the central position and that the waveguide group 52 is disposed circumferentially 300 GHz outward from the central position.

First, in a case where a multiplexed optical signal obtained by multiplexing optical signals ($\lambda 1$ to $\lambda 10$) is input to the first I/O waveguide 10, the multiplexed optical signal is branched into the two I/Os 12 and 13. The two optical signals into which the multiplexed optical signal has been branched and each of which includes 10 channels ($\lambda_1$ to $\lambda_{10}$) are guided to the slab waveguide 20 from the parabolic waveguide 14 and the parabolic waveguide 15. The light guided to the first slab waveguide 20 is input to the second slab waveguide 40 via the arrayed waveguide 30 and is then output to the second I/O waveguide 50.

At a connection portion where the second slab waveguide 40 and the second I/O waveguide 50 are connected, the optical signal input from the parabolic waveguide 14 is connected to the waveguide group 51 of the second I/O waveguide 50, and the optical signal input from the parabolic waveguide 15 is connected to the waveguide group 52 of the second I/O waveguide 50. Here, the only the optical signals with $\lambda_n$ (n is an odd number from 1 to 9: odd-numbered channels) included in light beams $\lambda_1$ to $\lambda_{10}$ input from the parabolic waveguide 14 are output to the waveguide group 51. The only the optical signals with $\lambda_{n+1}$ (n is an odd number from 1 to 9: even-numbered channels) included in light beams $\lambda_1$ to $\lambda_{10}$ input from the parabolic waveguide 15 are output to the waveguide group 51.

As described above, the optical signals with a channel frequency interval of 37.5 GHz ($\lambda_{n+1}-\lambda_n=37.5$ GHz) are divided into two output groups of $\lambda_1$, $\lambda_3$, $\lambda_5$, $\lambda_7$, and $\lambda_9$ and $\lambda_2$, $\lambda_4$, $\lambda_6$, $\lambda_8$, and $\lambda_{10}$, which are input to the respective waveguide groups 51 and 52. Each of the output groups has a channel frequency interval of 75 GHz ($\lambda_{n+2}-\lambda_n=75$ GHz), and the interval between the adjacent waveguides P in each of the waveguide groups 51 and 52 is equal to double the channel frequency interval between the optical signals $\lambda_n$ and $\lambda_{n+1}$ (n is an integer from 1 to 5). Thus, the channel frequency interval, that is, P=75 GHz can be set.

The invention claimed is:

1. An optical wavelength multiplexer/demultiplexer configured to demultiplex a multiplexed optical signal with a channel number N and a channel frequency interval $\Delta f$ into optical signals each with a wavelength $\lambda$, the optical wavelength multiplexer/demultiplexer comprising:
   an input waveguide configured to branch an input multiplexed optical signal into two inputs and to output the inputs from two waveguides;
   a first slab waveguide including a first end connected to second ends of the two waveguides;
   an arrayed waveguide connected to a second end of the first slab waveguide and including a plurality of waveguides provided at predetermined intervals and having different waveguide lengths;
   a second slab waveguide including a first end connected to the arrayed waveguide; and
   an output waveguide including two waveguide groups each including a plurality of waveguides connected to a second end of the second slab waveguide, wherein
   the two waveguides are arranged such that, in a case where a connection position where a first one of the two waveguides is connected to the first slab waveguide is set closer to a second one of the two waveguides by a channel frequency interval $\Delta f$, a central position between the two waveguides aligns with a central position on a connection end surface of the first slab waveguide, and the two waveguide groups of the output waveguide are arranged such that a central position between the two waveguide groups aligns with a central position of the second slab waveguide, and
   an interval between a connection position where the other waveguide is connected to the first slab waveguide and the central position on the connection end surface of the first slab waveguide is set equal to an interval between a connection position where the waveguide groups are connected to the second slab waveguide and a central position on a connection end surface of the second slab waveguide, and an interval between adjacent waveguides in each of the two waveguide groups is set double the channel frequency interval.

2. The optical wavelength multiplexer/demultiplexer according to claim 1, wherein
   the two waveguides are connected to parabolic waveguides.

3. The optical wavelength multiplexer/demultiplexer according to claim 1, wherein
   the plurality of waveguides of the arrayed waveguide are arranged in parallel along a circumference of a fan shape, and one of the two inputs is disposed on a circumferentially inner side of the fan shape.

4. The optical wavelength multiplexer/demultiplexer according to claim 2, wherein
   the plurality of waveguides of the arrayed waveguide are arranged in parallel along a circumference of a fan shape, and one of the two inputs is disposed on a circumferentially inner side of the fan shape.

* * * * *